United States Patent [19]
Olsen et al.

[11] Patent Number: 5,667,042
[45] Date of Patent: Sep. 16, 1997

[54] TORQUE TRANSMITTING APPARATUS WITH HYDROKINETIC TORQUE CONVERTER

[75] Inventors: Steven Olsen, Bühl; Rudolf Hönemann, Ottersweier, both of Germany; Wendy Boman, Wooster, Ohio

[73] Assignee: LuK Lamellen und Kupplungsbau GmbH, Buhl, Germany

[21] Appl. No.: 420,238

[22] Filed: Apr. 11, 1995

[30] Foreign Application Priority Data

Apr. 26, 1994 [DE] Germany .................. 44 14 521.7

[51] Int. Cl.⁶ .................................................. F16D 33/18
[52] U.S. Cl. .................. 192/3.29; 192/206; 192/212; 464/68
[58] Field of Search .................. 192/3.29, 3.28, 192/207, 212, 206; 464/68

[56] References Cited

U.S. PATENT DOCUMENTS

| | | |
|---|---|---|
| 5,103,947 | 4/1992 | Okuzumi . |
| 5,129,493 | 7/1992 | Edmunds ........................ 192/3.29 |
| 5,180,335 | 1/1993 | Maucher et al. . |

FOREIGN PATENT DOCUMENTS

| | | |
|---|---|---|
| 42 02 810 A1 | 8/1992 | Germany . |
| 42 08 905 A1 | 9/1992 | Germany . |
| 42 13 341 A1 | 11/1992 | Germany . |
| 43 33 562 A1 | 4/1994 | Germany . |

*Primary Examiner*—Andrea L. Pitts
*Attorney, Agent, or Firm*—Darby & Darby

[57] ABSTRACT

The rotary output element of a hydrokinetic torque converter can receive torque with limited play from the turbine or directly from the housing by way of a damper which operates in series with a lockup clutch. The lockup clutch can be engaged to transmit torque from the housing of the torque converter to the damper and the latter then transmits torque to the output element.

64 Claims, 4 Drawing Sheets

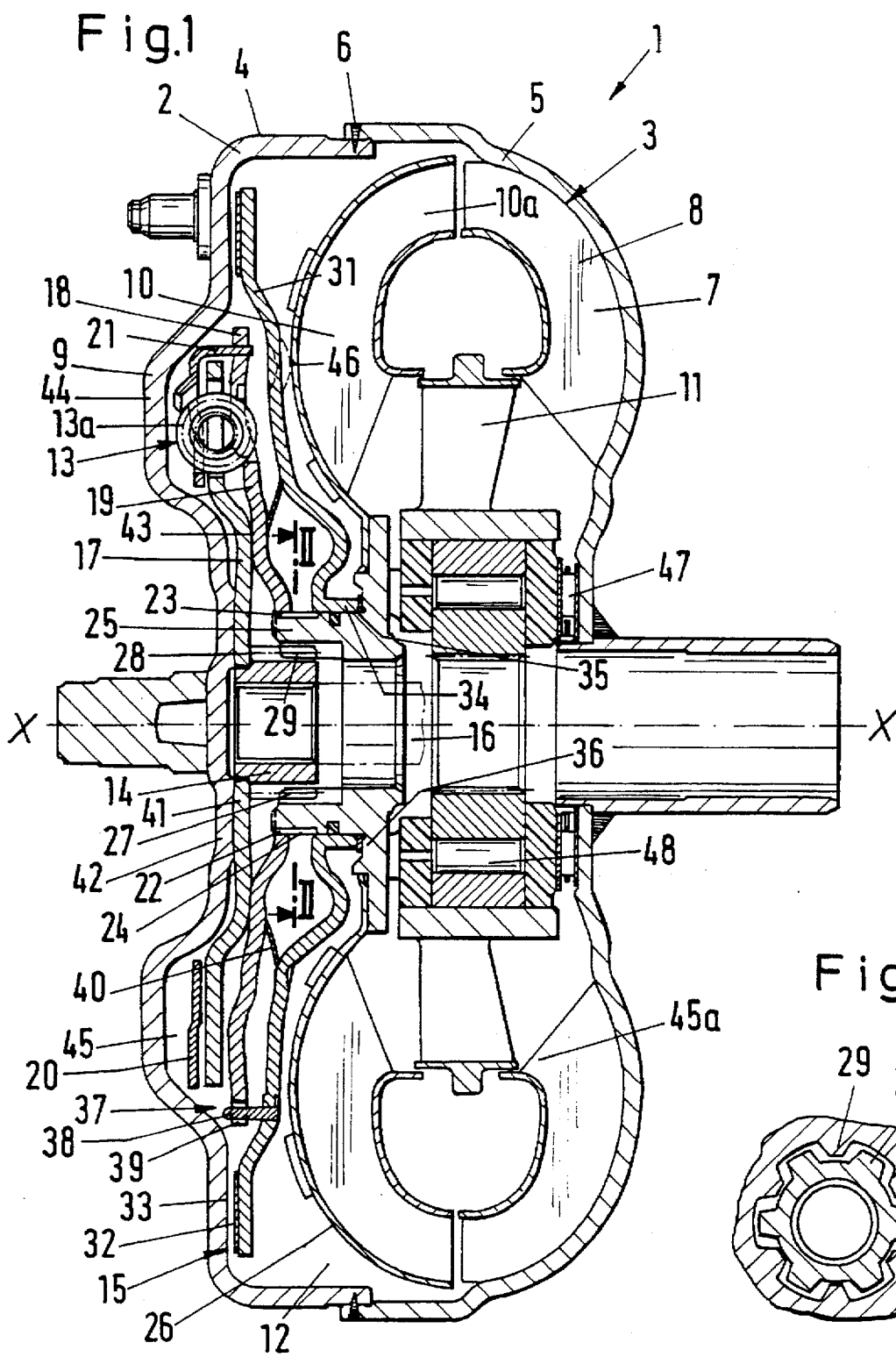

5,667,042

TORQUE TRANSMITTING APPARATUS WITH HYDROKINETIC TORQUE CONVERTER

BACKGROUND OF THE INVENTION

The invention relates to improvements in apparatus for transmitting torque, and more particularly to torque transmitting apparatus which utilize fluid-operated clutches, such as hydrokinetic torque converters.

A hydrokinetic torque converter comprises a rotary housing which is connectable with the output component of a prime mover (e.g., with the camshaft or crankshaft of a combustion engine in a motor vehicle), at least one pump which is driven by the housing, and a turbine which is installed in the housing and receives torque from the pump to transmit torque to an output element, e.g., to a hub which drives the input element of a driven unit such as the input shaft of a variable-speed transmission in the power train between the torque converter and one or more wheels of a motor vehicle. The torque converter can further comprise at least one stator which is installed in the housing between the at least one pump and the turbine. It is also known to provide such torque transmitting apparatus with at least one damper which is installed in a power flow between the housing and the output element of the torque converter. The damper or dampers serve to absorb vibrations of torque which is being transmitted from the housing to the output element of the torque converter.

Torque transmitting apparatus of the above outlined character are disclosed, for example, in published German patent application No. 42 13 341, in German patent application No. 43 33 562.4 and in U.S. Pat. No. 5,103,947. The disclosure of the U.S. Pat. No. 5,103,947, as well as the disclosures of the German patent applications and/or the corresponding applications and/or patents in countries other than Federal Republic Germany, are incorporated herein by reference.

OBJECTS OF THE INVENTION

An object of the invention is to provide a torque transmitting apparatus which is at least as versatile and reliable as heretofore known torque transmitting apparatus but can be produced at a much lower cost.

Another object of the invention is to provide an apparatus which can be assembled, either entirely or to a considerable extent, at the manufacturing plant so that it can be installed between a prime mover and one or more driven units in a surprisingly simple and time saving manner.

A further object of the invention is to provide an apparatus with one or more dampers the damping action of which is superior to that of damper or dampers in conventional torque transmitting apparatus.

An additional object of the invention is to provide an apparatus which can transmit large torques, at least when the torque is being transmitted by the torque converter, without necessitating the utilization of one or more complex, bulky and expensive dampers.

Still another object of the invention is to provide a torque transmitting apparatus the useful life of which exceeds that of heretofore known torque transmitting apparatus which employ a fluid-operated clutch and one or more dampers.

A further object of the invention is to provide a torque transmitting apparatus which is subject to less pronounced wear than heretofore known torque transmitting apparatus.

Another object of the invention is to provide a novel and improved torque transmitting connection between the turbine and the output element of the fluid-operated clutch in the above outlined torque transmitting apparatus.

An additional object of the invention is to provide a novel and improved method of transmitting torque from the rotary output component of a prime mover to the rotary input element(s) of one or more driven units along any one of a plurality of discrete paths.

SUMMARY OF THE INVENTION

One feature of the present invention resides in the provision of a torque transmitting apparatus which comprises a fluid-operated clutch (such as a hydrokinetic torque converter) including a housing connectable with a rotary output component of a prime mover (such as a combustion engine in a motor vehicle), at least one pump receiving torque from the housing, a rotary output element which is connectable with a rotary input element of a driven unit (e.g., a variable-speed transmission in the power train between the output element of the fluid-operated clutch and one or more wheels of a vehicle), and a turbine which is interposed between the at least one pump and the output element. The apparatus further comprises at least one torsional vibrations absorbing torque transmitting damper which is disposed in a power flow between the turbine of the fluid-operated clutch and the output element and includes an input member which is rotatable with the turbine, an output member connected with the output element and being rotatable relative to the input member, and energy storing means (e.g., a set of coil springs) arranged to oppose rotation of the input and output members relative to each other. The torque transmitting apparatus still further comprises a form-locking connection which is provided between and permits at least limited angular movements of the turbine and the output element of the fluid-operated clutch relative to each other. The clutch can further comprise at least one stator which is disposed between the at least one pump and the turbine.

The form-locking connection is or can be designed in such a way that it includes means for limiting the magnitude of torque which can be transmitted by the at least one damper. Such connection can include means for transmitting torque between the turbine and the output element of the fluid-operated clutch in parallel with the transmission of torque between the turbine and the output element by the at least one damper.

The improved apparatus can further comprise a lockup clutch or bypass clutch which is connected in series with the at least one damper. It is often preferred to install the lockup clutch in the housing of the fluid-operated clutch upstream of the at least one damper (as seen in the direction of transmission of torque from the housing to the output element of the fluid-operated clutch).

The form-locking connection can be provided between a radially inner portion of the turbine and the output element of the fluid-operated clutch, and such radially inner portion of the turbine can include or constitute a hub.

The form-locking connection can comprise external teeth provided on the turbine or on the output element of the fluid-operated clutch and internal teeth mating with the external teeth and provided on the output element or on the turbine. For example, the internal teeth can be provided on the aforementioned radially inner portion (such as a hub) of the turbine. The internal teeth can extend into a central passage which is provided in the radially inner portion of the turbine to (directly or indirectly) receive the input element of the driven unit. The length of such internal teeth can match or can be less than the axial length of the passage in the radially inner portion of the turbine.

The external teeth (e.g., external teeth provided on the output element of the fluid-operated clutch) can engage the internal teeth (e.g., the internal teeth of the radially inner portion of the turbine) with a predetermined play in the circumferential direction of the turbine. Such play determines the extent of angular movability of the turbine and the output element of the fluid-operated clutch relative to each other.

The input element of the driven unit can comprise or constitute a shaft which is surrounded by a hub forming part of or constituting the output element of the fluid-operated clutch. Alternatively, the apparatus can further comprise a hollow shaft which surrounds the input element of the fluid-operated clutch and is in turn surrounded by and centers the radially inner portion (e.g., a hub) of the turbine.

The output member of the at least one damper can be carried by the output element of the fluid-operated clutch. Such output member can comprise a substantially flange-like part which is rigid with the output element of the fluid-operated clutch.

The input member of the at least one damper can include a substantially disc-shaped or washer-like portion which is connected to the turbine (such as to the aforementioned hub forming part of or constituting the radially inner portion of the turbine) so that the hub can transmit torque to the substantially disc-shaped or washer-like portion or vice versa. The substantially disc-shaped or washer-like portion of the input member of the at least one damper can include an internal gear which mates with an external gear of the hub. The input member of the at least one damper can further comprise an annular portion (e.g., a second substantially washer-like or disc-shaped portion) which is rotatable with the first mentioned disc-shaped portion about a common axis and is spaced apart from the first mentioned disc-shaped portion in the direction of such common axis. The aforementioned flange-like portion of the output member of the at least one damper can be disposed at least in part between the substantially disc-shaped or washer-like portions of the input member (as seen in the direction of the common axis of the substantially disc-shaped or washer-like portions).

The substantially disc-shaped or washer-like portions of the input member of the at least one damper can be non-rotatably connected to each other radially outwardly of the substantially flange-like portion of the output member of the at least one damper. The connection is or can be such that the two portions of the input member cannot move relative to each other in the direction of their common axis.

The input and output members of the at least one damper are or can be provided with means (such as windows, holes, recesses or the like) for receiving portions of the energy storing means forming part of the at least one damper.

The input member of the at least one damper can be disposed at a first radial distance and the form-locking connection can be disposed at a lesser second radial distance from the common axis of the turbine, housing and at least one pump of the fluid-operated clutch.

The lockup clutch in the housing of the fluid-operated clutch includes a piston which is movable in the housing in the direction of the aforementioned common axis of the at least one pump, housing and turbine of the fluid-operated clutch. The piston of the lockup clutch can be centered by and can be mounted for movement relative to the hub of the turbine in the direction of the aforementioned common axis. Such piston can be non-rotatably connected to the turbine. The apparatus can further comprise means for non-rotatably connecting the piston of the lockup clutch to the input member of the at least one damper in such a way that the piston is movable relative to the input member in the direction of the common axis of the turbine and housing or vice versa. Such connecting means can be disposed at a first radial distance and the energy storing means of the at least one damper can be disposed at a lesser second radial distance from the common axis of the turbine and the housing of the fluid-operated clutch. The connecting means can include at least one plug which is provided on the piston or on the input member and at least one socket for the at least one plug provided on (e.g., in) the input member or the piston; the at least one plug preferably extends in at least substantial parallelism with the common axis of the turbine and the housing.

The form-locking connection can be provided between the hub of the turbine and the output element of the fluid-operated clutch. Such form-locking connection can comprise at least one plug provided on the hub or on the output element and extending at least substantially in the direction of the common axis of the turbine and housing into a socket provided for the plug at (e.g., in) the output element or the hub.

The housing of the fluid-operated clutch can comprise a wall which extends at least substantially radially of the common axis of the housing and the turbine and is adjacent the piston of the lockup clutch. The at least one damper is or can be disposed between such wall of the housing and the piston of the lockup clutch (as seen in the direction of the common axis).

Alternatively, the at least one damper can be disposed between the piston of the lockup clutch and the turbine, again as seen in the direction of the common axis of the housing and the turbine of the fluid-operated clutch). The piston is then disposed between the turbine and the aforementioned at least substantially radially extending wall of the housing.

The apparatus can further comprise resilient means (e.g., a diaphragm spring) reacting against the piston of the lockup clutch or against one of the substantially disc-shaped or washer-like portions of the input member of the at least one damper and bearing (in the direction of the common axis of the turbine and housing) against the one substantially disc-shaped or washer-like portion of the piston. For example, the resilient means can be installed to bear against the piston in a direction to move the piston in the direction of the axis of the turbine toward a position in which the lockup clutch is disengaged. The lockup clutch is engaged when the piston contacts and thus receives torque from the housing.

The output member of the at least one damper can act upon the housing in the direction of the common axis of the turbine and housing. Such output member can comprise a radially inner portion which is supported by the housing. The output member can directly engage and can be supported by the housing of the fluid-operated clutch. Such apparatus can comprise means for biasing the output member toward the housing in the direction of the common axis of the housing and the turbine. The biasing means can be interposed between the input member of the at least one damper and the piston of the lockup clutch (as seen in the direction of the aforementioned common axis).

The input member of the at least one damper can abut the output member of such damper in the direction of the common axis of the housing and turbine.

The turbine can abut the piston of the lockup clutch in at least one of several positions of the piston (as seen in the direction of the common axis of the housing and the turbine).

The aforementioned radial wall of the housing and the piston of the lockup clutch can define a fluid-filled compartment, and the pressure of fluid in such compartment can be regulated to change the axial position of the piston. The wall or another portion of the housing can be provided with a friction face (e.g., a friction face of a friction lining affixed to the housing) which is contacted by a radially outer portion of the piston in the (at least partially) engaged condition of the lockup clutch. The radially outer portion of the fluid-filled compartment is sealed from another compartment in the housing when the radially outer portion of the piston (e.g., a friction lining affixed to the piston) contacts the friction face of the housing. The pressure of fluid in the other compartment of the housing can be regulated to determine the magnitude of force with which the radially outer portion of the piston bears against the friction face of the housing in the (at least partially) engaged condition of the lockup clutch.

The input member of the at least one damper can be connected to a shell of the turbine at a location substantially or exactly midway between the radially inner and radially outer portions of such shell. The shell can be connected to the input member by one or more rivets or by resorting to other suitable fastener means.

The radially inner portion of the piston forming part of the lockup clutch can sealingly surround the input element of the driven unit in such a way that the piston is movable relative to the input element in the direction of the common axis of the turbine and the housing. The radially inner portion of the piston can include a sleeve which surrounds the input element. Such radially inner portion of the piston can be provided with a recess (e.g., a circumferentially complete groove) for a sealing element which extends into the recess and sealingly engages the input element of the driven unit. In addition to or in lieu of the aforementioned sealing element, the improved apparatus can be provided with a sealing element which is mounted on (e.g., recessed into an external circumferential groove of) the input element and sealingly engages the radially inner portion of the piston.

If the fluid-operated clutch comprises a stator which is installed between the turbine and the at least one pump (as seen in the direction of the common axis of the housing and the turbine), the radially inner portion of the shell of the turbine can be caused to abut the stator.

It is also possible to design and install the turbine in such a way that its radially inner portion is centered by and is rotatable relative to the output element of the fluid-operated clutch. The energy storing means of the at least one damper is then preferably constructed and installed to oppose rotation of the turbine and the output element relative to each other.

The apparatus can be constructed in such a way that the turbine of the fluid-operated clutch is rotatable jointly with the input member of the at least one damper.

The piston of the lockup clutch can be installed in the housing of the fluid-operated clutch in such a way that it is rotatable with the turbine of the fluid-operated clutch.

Another feature of the invention resides in the provision of a torque transmitting apparatus which comprises a fluid-operated clutch (such as a hydrokinetic torque converter) including a housing connectable with a rotary output component of a prime mover, at least one pump receiving torque from the housing, a rotary output element connectable with a rotary input element of a driven unit (e.g., a variable-speed transmission), and a turbine which is interposed between the at least one pump and the output element. The apparatus further comprises at least one torsional vibrations absorbing torque transmitting damper which is disposed in a power flow between the turbine and the output element, and a form-locking connection which is provided between the turbine and the output element and includes means for transmitting torque between the turbine and the output element in parallel with the transmission of torque by the at least one damper.

A further feature of the invention resides in the provision of a torque transmitting apparatus which comprises a fluid-operated clutch (e.g., a hydrokinetic torque converter) including a housing connectable with a rotary output component of a prime mover, at least one pump receiving torque from the housing, a rotary output element connectable with a rotary input element of a driven unit (e.g., a variable-speed transmission between the fluid-operated clutch and one or more wheels of a motor vehicle), and a turbine which is disposed between the at least one pump and the output element and is rotatable with the at least one pump and with the housing about a common axis. The apparatus further comprises at least one torsional vibrations absorbing torque transmitting damper which is disposed in the power flow between the turbine and the output element of the fluid-operated clutch and includes an input member having a substantially washer-like annular portion, a lockup clutch which is provided in the housing in series with the at least one damper and includes a piston movable in the direction of the aforementioned common axis, and resilient means reacting against the piston or the substantially washer-like annular portion and bearing in the direction of the common axis against the substantially washer-like annular portion or against the piston. The arrangement can be such that the resilient means bears against the piston in a direction to move the piston in the direction of the common axis toward a position in which the lockup clutch is disengaged.

An additional feature of the invention resides in the provision of a torque transmitting apparatus which comprises a fluid-operated clutch (such as a hydrokinetic torque converter) including a housing connectable to a rotary output component of a prime mover, at least one pump receiving torque from the housing, a rotary output element connectable with a rotary input element of a driven unit (such as a variable-speed transmission), and a turbine disposed between the at least one pump and the output element. The torque transmitting apparatus further comprises at least one torsional vibrations absorbing torque transmitting damper which is disposed in a power flow between the turbine and the output element, and a lockup clutch which operates in series with the at least one damper and includes a piston movable between a plurality of positions in the direction of a common axis of the turbine and the housing of the fluid-operated clutch. The turbine abuts the piston in at least one of the plurality of different positions of the piston.

Still another feature of the invention resides in the provision of a torque transmitting apparatus which comprises a fluid-operated clutch (e.g., a hydrokinetic torque converter) including a housing connectable with a rotary output component of a prime mover, at least one pump which receives torque from the housing, a rotary output element connectable with a rotary input element of a driven unit (e.g., a variable-speed transmission), and a turbine which interposed between the at least one pump and the output element, which includes a shell and which is rotatable with the housing about a common axis. The shell of the turbine includes radially inner and radially outer portions and the apparatus further comprises at least one torsional vibrations absorbing torque transmitting damper which is disposed in a power flow between the turbine and the output element and includes an input member connected with the shell substantially or exactly midway between the radially inner and the radially outer portions of the shell.

An additional feature of the invention resides in the provision of a torque transmitting apparatus which comprises a fluid-operated clutch (e.g., a hydrokinetic torque converter) including a housing connectable with a rotary output component of a prime mover, at least one pump receiving torque from the housing, a rotary output element connectable with a rotary input element of a driven unit (e.g., a variable-speed transmission), and a turbine which is interposed between and is rotatable with the at least one pump and the output element about a common axis. The torque transmitting apparatus further comprises at least one torsional vibrations absorbing torque transmitting damper disposed in a power flow between the turbine and the output element of the fluid-operated clutch, and a lockup clutch which is provided in the housing in series with the at least one damper and includes a piston movable in the direction of the common axis. The piston includes a radially inner portion which sealingly and axially movably surrounds the input element of the driven unit.

The radially inner portion of the piston can include or can constitute a sleeve which surrounds the input element of the driven unit.

Furthermore, the radially inner portion of the piston can be provided with a recess (e.g., in the form of a circumferentially complete groove), and the apparatus then further comprises a sealing element (e.g., an O-ring) extending into the recess and engaging the input element of the driven unit. Alternatively, or in addition to such O-ring or an analogous sealing element, the apparatus can comprise a sealing element (such as an O-ring) which is provided on the input element and sealingly engages the radially inner portion of the piston.

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is an axial sectional view of a torque transmitting apparatus which embodies one form of the invention and wherein the fluid-operated clutch includes a hydrokinetic torque converter;

FIG. 2 is a fragmentary transverse sectional view substantially as seen in the direction of arrows from the line II—II in FIG. 1 and shows one presently preferred embodiment of a form-locking connection between the turbine and the output element of the torque converter;

DESCRIPTION OF PREFERRED EMBODIMENTS

Figure 3:
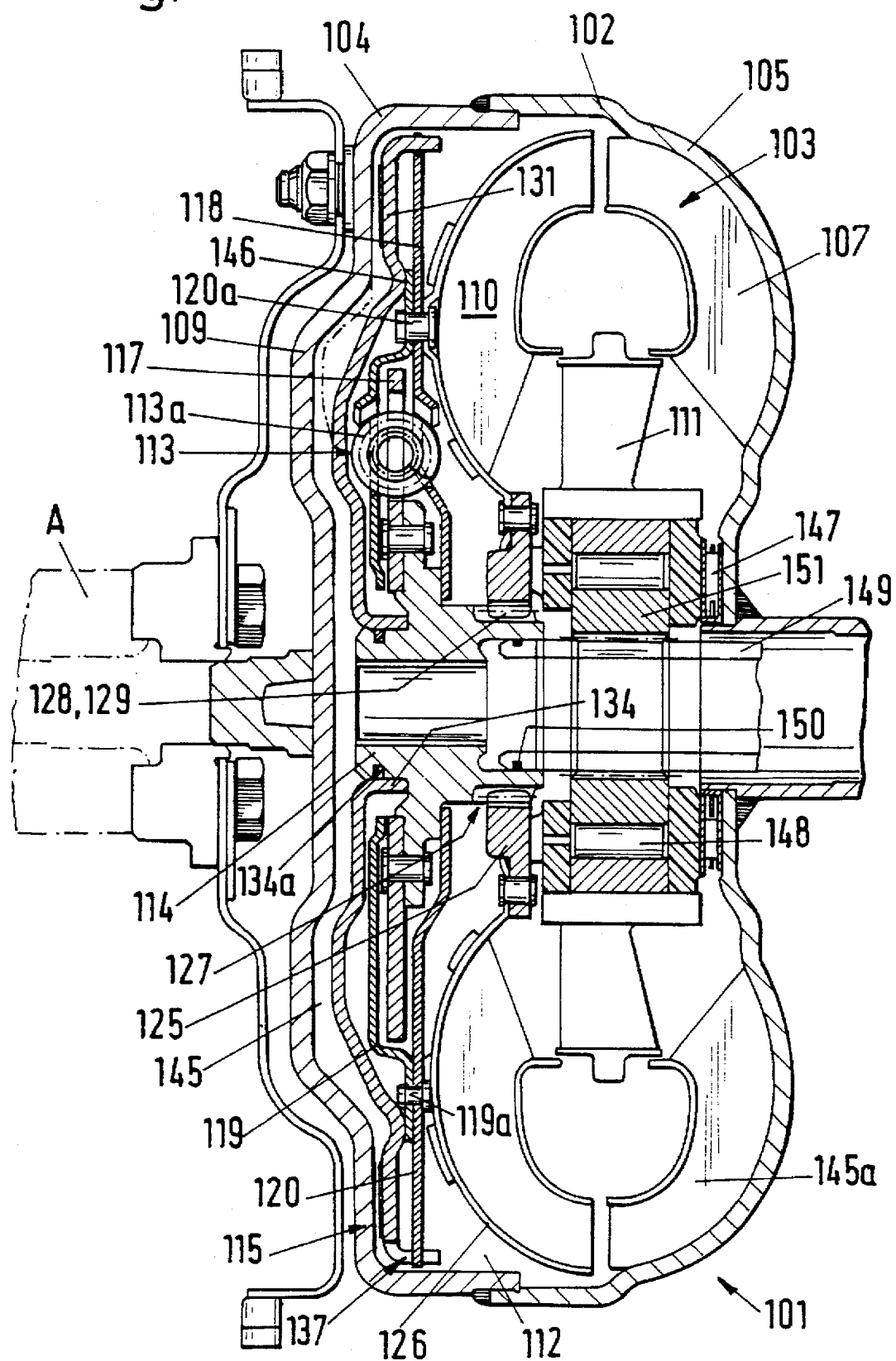
FIG. 3 is an axial sectional view of a torque transmitting apparatus constituting a modification of the apparatus of FIGS. 1 and 2.

The torque transmitting apparatus 1 which is shown in FIGS. 1 and 2 comprises a fluid-operated clutch 3 which constitutes a hydrokinetic torque converter and comprises a housing 2 connectable to a rotary output component (such as the one shown at A in FIG. 3) of a prime mover. For example, the output component can constitute the camshaft or the crankshaft of a combustion engine in a motor vehicle. The connection between the housing 2 and the output component A of the prime mover can be of the type disclosed, for example, in published European patent application No. 0 066 381 or in published European patent application No. 0 037 059. These publications disclose a torque transmitting member which can be made of metallic sheet material and includes a radially inner portion connected to the output component of the prime mover and a radially outer portion connected to the housing of the hydrokinetic torque converter.

The housing 2 comprises a first substantially cup-shaped section 4 which is connectable to the output component A and a second substantially cup-shaped section 5. A portion of the section 4 is telescoped into the adjacent portion of the section 5, and such portions of the two sections are non-rotatably and sealingly connected to each other by a welded seam 6.

In the torque converter which is shown in FIG. 1, a portion of the section 5 of the housing 2 constitutes the shell of a pump 7 forming part of the torque converter. The vanes 8 of the pump 7 are affixed to the inner side of the housing section 5. The torque converter 3 further comprises a turbine 10 and a stator 11 which is installed between the pump 7 and the turbine 10 as seen in the direction of the common axis X—X of the parts 2, 7 and 10 of the torque converter. The turbine 10 is disposed between the stator 11 and a radially extending wall 9 of the housing section 4, again as seen in the direction of the axis X—X. The turbine 10 and the pump 7 extend radially beyond the stator 11.

The sections 4 and 5 of the housing 2 define a chamber 12 which is filled with a suitable hydraulic fluid (such as oil) and confines the turbine 10, the stator 11 and the vanes 8 of the pump 7 as well as a damper 13 and a lockup clutch or bypass clutch 15. The damper 13 establishes a torque transmitting connection between the section 4 of the housing 2 and a rotary output element 14 of the torque converter 3 when the lockup clutch 15 is fully or at least partially engaged (i.e., when the clutch 15 transmits torque with or without slip). On the other hand, the damper 13 transmits torque between the turbine 10 and the output element 14 when the lockup clutch 15 is disengaged or operates with at least some slip. The lockup clutch 15 is installed and constructed to operate in series with the damper 13.

The output element 14 of the torque converter 3 comprises a hub having internal teeth which mate with the external teeth of a rotary input element 16, e.g., the input shaft of a driven unit such as a variable-speed transmission in the power train between the torque converter 3 and one or more wheels of a motor vehicle. The turbine 10 can be caused to turn relative to the output element 14 against the opposition of the damper 13 and, in the embodiment of FIG.

1, to a limited extent. However, it is within the purview of the invention to replace the illustrated damper 13 with a damper whose operation is based on the so-called shearing principle of a hydraulic fluid (such as grease); this modified damper merely opposes but cannot prevent rotation of the turbine 10 and the output element 14 relative to each other through any desired angle.

The illustrated damper 13 comprises a substantially flange-like output member 17 which is non-rotatably connected with the output element 14 of the torque converter 3. The input member 18 of the damper 13 comprises two axially spaced apart substantially washer-like or disc-shaped annular portions 19, 20 which are non-rotatably connected to each other radially outwardly of the flange-like output member 17. The latter is disposed between the portions 19 and 20 of the input member 18, again as seen in the direction of the common axis X—X of the rotary constituents of the torque converter 3.

The damper 13 further comprises energy storing means 13a, e.g., in the form of an annular array of coil springs, and the input and output members 18, 17 are provided with means for engaging the coil springs of the damper. Such engaging means can include windows in the output member 17 and windows or recesses in the portion 19 and/or 20 of the input member 18.

The connection between the portions 19, 20 of the input member 18 radially outwardly of the output member 17 includes plugs 21 which can constitute lugs of one piece with the portion 20 and extending in at least substantial parallelism with the axis X—X into complementary sockets or recesses of the portion 19. Portions of the plugs 21 can be deformed to establish a reliable connection between the portions 19 and 20 of the input member 18.

The portion 19 of the input member 18 is non-rotatably secured to the turbine 10 by a form-locking connector 22 which is configurated and mounted in such a way that the turbine and the input member 18 can move relative to each other in the direction of the axis X—X. The connector 22 of FIG. 1 comprises an internal gear 23 which is affixed to or forms part of the radially inner part of the portion 19 and an external gear 24 provided on or forming part of a radially inner portion or hub 25 of the turbine 10. The gears 23, 24 cooperate to hold the turbine 10 and the input member 18 against rotation relative to each other but do not interfere with axial movements of the turbine 10 relative to the input member 18 and/or vice versa. The radially inner portion or hub 25 of the turbine 10 in the torque converter 3 of FIG. 1 is a separately produced part which is welded and/or otherwise non-rotatably affixed to a shell 26 of the turbine.

In accordance with a feature of the invention, the torque transmitting apparatus 1 further comprises a form-locking connection 27 which is provided between the turbine 10 and the output element 14 and permits at least limited angular movements of the parts 10, 14 relative to each other. The details of the connection 27 are shown in FIG. 2. Such connection includes external teeth 28 provided on the output element 14 and extending with a predetermined clearance or play (shown at 30) into tooth spaces between the internal teeth 29 of the turbine 10. The mating teeth 28, 29 of the connector 27 permit axial movements of the turbine 10 and the output element 14 relative to each other. In this respect, the connection 27 is analogous to the connector 22 whose gears 23, 24 permit axial movements of the hub 25 of the turbine 10 and of the portion 19 of the input member 18 relative to each other. Such construction simplifies the assembly of the connector 22 and of the form-locking connection 27.

As can be seen in FIG. 2, the external teeth 28 can be machined into or otherwise formed in the external surface of the output element 14, and the internal teeth 29 can be machined into or otherwise formed in the hub 25 of the the turbine 10. The extent to which the output element 14 and the turbine 10 are movable relative to each other in the direction of the axis X—X is or can be limited. The clearances 30 between the mating teeth 28 and 29 permit the turbine 10 or the input element 14 to turn relative to the other of these parts at least in one direction. However, it is also possible, and often advisable, to select the clearances in such a way that the turbine 10 can turn relative to the output element 14 in a clockwise direction or in a counterclockwise direction and/or that the output element can turn relative to the turbine in each such direction. Such rotation in one direction will take place when the engine of a motor vehicle embodying the torque transmitting apparatus 1 is coasting, and the rotation will take place in the other direction when the engine is caused to pull a load. The extent to which the connection 27 or an analogous form-locking connection permits the turbine 10 and the output element 14 to turn relative to each other in one direction can be different from the extent to which such parts can turn relative to each other in the opposite direction.

The damper 13 is installed between the radially extending wall 9 of the housing section 4 and the annular piston 31 of the lockup clutch 15. The piston 31 can be made of metallic sheet material and is mounted in the chamber 12 for movement between a plurality of different positions as seen in the direction of the axis X—X. The radially outer portion of the piston 31 is provided with a friction lining 32 having an exposed friction face which contacts a complementary friction face 33 at the inner side of the wall 9 when the lockup clutch 15 is at least partially engaged. The piston 31 is centered by and is movable relative to the hub 25 of the turbine 10 in the direction of the axis X—X. To this end, the radially inner portion of the piston 31 includes or constitutes a relatively short sleeve or cylinder 34. A suitable sealing element (e.g., an O-ring) is installed between the internal surface of the sleeve 34 and the external surface of the hub 25 to prevent uncontrolled flow of hydraulic fluid between a first compartment 45 of the chamber 12 and a second compartment 45a which receives the vanes 8 of the pump 7. The piston 31 abuts the turbine 10, at least when the lockup clutch 15 is disengaged. In the apparatus 1 of FIG. 1, the sleeve 34 of the piston 31 then abuts a tolerance-compensating ring 35 which, in turn, abuts a radially extending portion 36 of the hub 25. The ring 35 renders it possible to determine the extent of movement of the piston 31 from the position of contact of its friction lining 32 with the friction face 33 toward the hub 25 with a very high degree of accuracy.

The piston 31 is non-rotatably connected with the input member 18 of the damper 13 but has limited freedom of axial movement relative to the portions 19, 20 of the input member. This is accomplished by the provision of a plug-in connection 37 between the piston 31 and the portion 19 of the input member 18. The illustrated connection comprises plugs 38 which are affixed to the piston 31 and extend, preferably with no play at all or with minimal play, into complementary holes, recesses or like female detents 39 in the portion 19 of the input member 18. However, it is equally possible to replace the illustrated connection 37 with a set of leaf springs operating between the axially movable pressure plate and the axially fixed cover or housing of a friction clutch of the type often utilized in the power trains of motor vehicles. The leaf springs permit the piston 31 to move in the direction of the axis X—X with respect to the input member 18. Reference may be had, for example, to commonly owned U.S. Pat. No. 5,180,335 granted Jan. 19, 1993 to Paul Maucher et al. for "Torsion damping assembly for use with clutches in motor vehicles". The disclosure of this patent is incorporated herein by reference.

The torque transmitting apparatus 1 further comprises resilient means 40 (e.g., a diaphragm spring) which operates between the portion 19 of the input member 18 of the damper 13 and the piston 31 to bias the piston away from the portion 19, i.e., toward an axial position corresponding to the disengaged condition of the lockup clutch 15. The resilient means 40 operates in the direction of the axis X—X and urges the piston 31 toward the turbine 10; at the same time, such resilient means urges the input member 18 and the output member 17 of the damper 13 in a direction away from the turbine 10, i.e., axially and toward the wall 9 of the housing section 4. This, in turn, ensures that all parts of the damper 13 are maintained in predetermined axial positions relative to the section 4 of the housing 2. As can be seen in FIG. 1, the radially inner part 41 of the flange-like output member 17 of the damper 13 bears directly against the adjacent radially inner portion 42 of the wall 9. If desired, the apparatus 1 can be provided with one or more friction rings or slip rings or one or more bearings (not shown) which are installed between the part 41 and the portion 42.

A radially outer portion of the output member 17 is in frictional engagement with the portion 19 of the input member 18 (as at 43) to establish a frictional hysteresis in parallel with that generated by the energy storing means 13a when the input and output members 18, 17 of the damper 13 are caused to turn relative to each other. It is equally possible to provide a friction lining or slip ring at the locus 43, i.e., in the region of contact between the output member 17 and the portion 19 of the input member 18.

The wall 9 of the housing section 4 is provided with an annular recess 44 which extends toward the prime mover (not shown but being assumed to be located to the left of the housing section 4, as viewed in FIG. 1) and provides room for the energy storing means 13a as well as for those parts of the damper 13 which are adjacent the energy storing means. The recess 44 can be sufficently deep to accommodate at least a major part of the energy storing means 13a.

The aforementioned compartment 45 is disposed between the radially extending wall 9 of the housing section 4 and the piston 31 of the lockup clutch 15. This compartment can receive pressurized fluid (such as oil) by way of one or more conduits (not shown) discharging into the radially inner portion of the compartment. As the pressure of fluid in the compartment 45 increases, the piston 31 is caused to move axially and away from the friction face 33 of the wall 9 so that the lockup clutch 15 is disengaged. The fluid pressure in the compartment 45 can also be regulated for the purpose of selecting the extent of slip between the friction lining 32 of the piston 31 and the friction face 33 on the wall 9. In other words, the pressure of fluid in the compartment 45 can be varied for the purpose of selecting the exact condition of the lockup clutch 15 and more specifically the magnitude of torque which the lockup clutch can transmit from the housing 2 of the torque converter 3 directly to the input member 18 of the damper 13.

When the vehicle embodying the torque transmitting apparatus 1 is coasting, (i.e., when the RPM of the turbine 10 exceeds the RPM of the pump 7 and housing 2), the pressure of fluid in the annular second compartment 45a of the chamber 12 exceeds the pressure in the compartment 45 so that the turbine 10 is urged axially toward the piston 31. In the apparatus 1 of FIG. 1, the shell 26 of the turbine 10 then abuts directly against the piston 31, as at 46, so that (and assuming that the lockup clutch 15 is engaged) the friction lining 32 of the piston 31 is urged into more pronounced engagement with the friction face 33 of the wall 9. It will be seen that, when the vehicle is coasting, the piston 31 of the lockup clutch 15 can take up axial stresses which are being applied to the turbine 10. This renders it possible to dispense with means for establishing an abutment against axial movement of the hub 25 of the turbine 10 beyond a predetermined axial position relative to the wall 9.

FIG. 1 shows that the locus 46 of contact between the piston 31 and the turbine 10 is located substantially midway between the radially inner and radially outer portions of the shell 26. However, it is equally possible to transfer the locus 46 of contact further away from the axis X—X so that the piston 31 can be contacted by the radially outer portion of the shell 26. The illustrated locus 46 of contact is established due to the provision of a circumferentially complete or interrupted annular rib on a selected portion of the piston 31 radially inwardly of the friction lining 32. In addition to constituting an abutment for the adjacent (normally median or substantially median) portion of the shell 26, the rib at the locus 46 can further serve as a means for stiffening the piston, i.e., for reducing the likelihood of deformation of the piston in the direction of the axis X—X. Irrespective of its exact location, it is normally preferred to select the position of the rib at 46 in such a way that it is located opposite the blades or vanes 10a of the turbine 10.

When the lockup clutch 15 is disengaged or is operated with slip, and when the vehicle is in the process of pulling a load, the turbine 10 is driven by the housing 2 by way of the pump 7. At such time, the pressure differential between the bodies of fluid in the compartments 45 and 45a of the internal chamber 12 of the housing 2 is such that the turbine 10 is urged in the direction of the axis X—X toward the pump 7. The turbine 10 then abuts the stator 11 of the torque converter 3, and the stator 11 then bears against a thrust bearing 47 which is adjacent the inner side of the radially innermost portion of the housing section 5. A freewheel 48 enables the stator 11 to rotate in one direction about the axis X—X.

The torque transmitting apparatus 101 of FIG. 3 includes a number of constituents which are either identical with or similar or clearly analogous to the corresponding constituents of the torque transmitting apparatus 1. Those constituents of the apparatus 101 which are identical with or clearly analogous to the corresponding constituents of the apparatus 1 of FIG. 1 are denoted by similar reference characters plus 100. The apparatus 101 also comprises a fluid-operated clutch 103 which constitutes a hydrokinetic torque converter and includes a housing 102. The construction and mounting of the pump 107 and the stator 111 of the torque converter 103 are or can be the same as described in connection with the corresponding parts 7 and 11 in the torque converter 3 of FIG. 1.

The turbine 110 is connected with a hub-shaped output element 114 of the torque converter 103 by a form-locking connection 127 which is designed to permit limited angular movements of the turbine and the output element relative to each other. The connection 127 comprises external teeth 128 provided at the exterior of the output element 114 and mating with internal teeth 129 carried by the adjacent portion of the turbine 110. The teeth 129 are of one piece with a hub 125 which is a separately produced part of the turbine 110 and the radially outer portion of which is connected to the shell 126 of the turbine by rivets or in any other suitable way. However, it is equally possible to replace the hub 125 with a radially inwardly extending portion of the shell 126, and such radially inwardly extending portion of the shell 126 is then provided with internal teeth 129 mating with the external teeth 128 of the output element 114. The internal teeth of the shell 126 can constitute suitably deformed portions of the radially innermost part of such shell. The shell 126 is or can be made of metallic sheet material; if the internal teeth 129 are of one piece with such shell, the radially innermost portion of the shell can be made thicker than the radially outer portion in order to ensure the making of teeth 129 which are capable of cooperating with the teeth 128 to reliably limit the extent of angular movability of the turbine 110 and the output element 114 relative to each other.

The extent of movability of the turbine 110 in a direction axially and away from the radially extending wall 109 of the housing section 104 is limited by the stator 111 which can be caused to abut a thrust bearing 147 at the inner side of the radially innermost portion of the housing section 105.

The torque transmitting apparatus 101 further comprises a torque transmitting torsional vibrations compensating damper 113 which operates between the turbine 110 and the output element 114 and is installed between the turbine and the piston 131 of the lockup clutch or bypass clutch 115 (as seen in the direction of the common axis of the housing 102, pump 107 and turbine 110). The piston 131 and the wall 109 of the housing section 104 define a fluid-filled compartment 145 forming part of the internal chamber 112 of the housing 102. As already explained with reference to FIG. 1, the pressure of fluid (such as oil) in the compartment 145 can be regulated to engage the lockup clutch, to disengage the lockup clutch or to cause this clutch to operate with a selected amount of slip. The radially inner portion of the piston 131 is centered by and can perform limited axial movements relative to the output element 114 of the torque converter 103. Such radially inner portion of the piston 131 includes or constitutes a relatively short sleeve or cylinder 134 and surrounds a sealing element 134a (e.g., an O-ring) which is recessed into a circumferentially complete groove provided therefor in the peripheral surface of the output element 114. The purpose of the sealing element 134a is to prevent the flow of fluid between the compartment 145 and the other annular compartment 145a of the chamber 112 which is defined by the housing 102 and confines the turbine 110, the stator 111, the vanes of the pump 107, the damper 113 and the lockup clutch 115.

The piston 131 is non-rotatably connected with but has at least limited freedom of axial movement relative to the input member 118 of the damper 113. A plug-in type connection 137 is provided to hold the piston 131 against rotation relative to the input member 118, and such connection is located radially outwardly of the friction lining on the piston 131.

The input member 118 of the damper 113 comprises two coaxial substantially disc-shaped or washer-like annular portions 119, 120 which are fixedly secured to each other by rivets 119a located radially inwardly of the friction lining on the piston 131. The radially inner parts of the portions 119, 120 of the input member 118 are spaced apart from each other in the axial direction of the torque converter 103 and define an annular space for the substantially flange-like output member 117 of the damper 113. The output member 117 is riveted to the output element 114 and the damper 113 further comprises energy storing means 113a (e.g., an annular array of coil springs) which operate between the output member 117 and the portions 119, 120 of the input member 118.

The radially outer portion of the input member 118 is fixedly connected to the shell 126 of the turbine 110 by rivets 120a which further serve to establish a rigid connection between the portions 119, 120 of the input member 118. The rivets 120a can alternate with the rivets 119a, as seen in the circumferential direction of the turbine 110.

It is presently preferred to install the rivets 120a at least substantially midway between the radially inner and the radially outer portions of the shell 126. The rivets 119a and/or 120a can be replaced with other types of fasteners and/or with welded joints without departing from the spirit of the invention.

The reference character 146 denotes in FIG. 3a region of contact between the piston 131 and the input member 118 of the damper 113; such region of contact is located radially outwardly of the rivets 120a, i.e., radially outwardly of the connection between the input member 118 and the turbine 110. However, it is equally possible to select a different location for the region of contact between the piston 131 and the output member 118, namely nearer to or further away from the axis of the turbine 110. The placing of the region of contact between the piston 131 and the input member 118 (or between the piston 131 and the turbine 110) at a relatively long distance from the axis of the turbine exhibits the advantage that the piston 131 is subjected to less pronounced axial bending or flexing stresses or that such bending is reduced to zero.

The turbine 110 abuts or can abut the piston 131 when the vehicle embodying the torque transmitting apparatus 101 is coasting.

The flange-like output member 117 of the damper 113 is connected with the output element 114 at least in such a way that these parts cannot rotate relative to each other. The manner in which the springs of the energy storing means 113a of the damper are mounted between the flange-like output member 117 and the portions 119, 120 of the input member 118 is or can be the same as described with reference to the damper 13 of FIG. 1.

The freewheel 148 for the stator 111 surrounds a hollow shaft 149 which, in turn, surrounds the input element of the driven unit, not shown in FIG. 3. An annular sealing element 150 is installed in a groove provided in the external surface of the hollow shaft 149 and engages that portion of the output element 114 which is adjacent the freewheel 148. The latter includes an inner race 151 which is centered on the hollow shaft 149 as seen in the radial direction of the torque converter 103. The freewheel 148 can include a set of sprags which operate between the inner race 151 and an outer race of the freewheel. The sprags permit the outer race and the stator 111 to rotate in one direction relative to the inner race 151 and the hollow shaft 149.

The inner race 151 is non-rotatably affixed to the hollow shaft 149 and the latter can surround the input shaft of the driven unit or can constitute such input shaft or can be connected to the case of the driven unit (such as a variable-speed transmission of the type used in the power trains between the clutches and the wheels of motor vehicles). For example, the shaft 149 can be at least non-rotatably affixed to the case of a variable-speed transmission.

The sealing elements 134a and 150 are located at the same radial distance (or at least close to the same radial distance) from the axis of the turbine 110. Such positioning and dimensioning of the sealing elements ensures that the fluid which fills the chamber 112 of the housing 102 exerts no axial force (or only a negligible axial force) upon the output element 114 of the torque converter 103. In other words, the output element 114 cannot act as a piston and, therefore, it is not necessary to provide a thrust bearing for the purpose of counteracting the axial forces generated by the output element. Another advantage of the feature that the output element 114 cannot and does not act as a piston is that the output element cannot generate so-called extraneous friction which is undesirable in many or most instances.

The just described feature that the sealing elements 134a, 150 have identical or practically identical diameters can be resorted to with the aforediscussed advantages in the torque transmitting apparatus of the present invention as well as in a number of conventional hydrokinetic torque converters wherein the turbine transmits torque to one or more driven units by way of an output element corresponding to or resembling the output element 114 of the torque converter 103. Still further, such feature can be embodied in torque converters wherein the turbine is non-rotatably connected to a hub or an analogous output element. Reference may be had, for example, to published German patent applications Nos. 42 02 810 and 42 08 905.

An important advantage of the form-locking connections 27 and 127 (which operate in parallel with the respective dampers 13 and 113) is that, due to the inability of the turbine 10 or 110 and the output element 14 or 114 to turn relative to each other beyond a limited extent, as determined by the clearances 30 between the teeth 28, 29 of the connection 27 and the teeth 128, 129 of the connection 127, the damper 13 or 113 is practically bypassed as soon as the magnitude of the torque being transmitted by the turbine 10 or 110 exceeds a predetermined value. In other words, and referring to FIG. 3, once such predetermined value of the magnitude of torque being transmitted by the turbine 110 is exceeded, the torque is no longer transmitted by the damper 113 but rather directly by the form-locking connection 127. The same applies for the turbine 10, the damper 13 and the form-locking connection 27 in the torque converter 3 of FIG. 1.

Since the magnitude of torque which must be transmitted by the dampers 13 and 113 is limited, the input and output members (18, 17 and 118, 117) of such dampers are not subjected to excessive deforming and/or other stresses. In other words, it is possible to utilize relatively simple, lightweight and inexpensive dampers which are merely called upon to transmit relatively small torques, namely those which must be be transmitted by the dampers in order to compensate for eventual fluctuations of transmitted torque.

The apparatus 1 or 101 must transmit large torques when the respective lockup clutches 15, 115 are disengaged, i.e., when the turbines 10, 110 receive torque by way of the respective pumps 7, 107. At such time, the torque which is being transmitted by the pump 7 or 107 and the respective turbine 10 or 110 can be several times the torque which is being transmitted by the output component A of the prime mover.

Another advantage of the provision of the form-locking connections 27, 127 is that it is not necessary to provide specially designed means (such as abutments or the like) for limiting the extent of angular movability of the input and output members 18, 17 or 118, 117 relative to each other.

The hubs 25, 125 of the respective turbines 10, 110 and the output elements 14, 114 can be (and preferably are) made of a sintered material. This greatly reduces the cost of the making of such parts because the provision of teeth 28, 29 and/or 128, 129 involves no additional expenses, i.e., such teeth can be provided in the course of the sintering operation. In other words, it is not necessary to make the teeth 28, 29 and/or the teeth 128, 129 by removing material from metallic, plastic or other blanks.

It is also within the purview of the invention to make the components of the form-locking connection 27 and/or 127 in a suitable forging or extruding machine.

Figure 4:
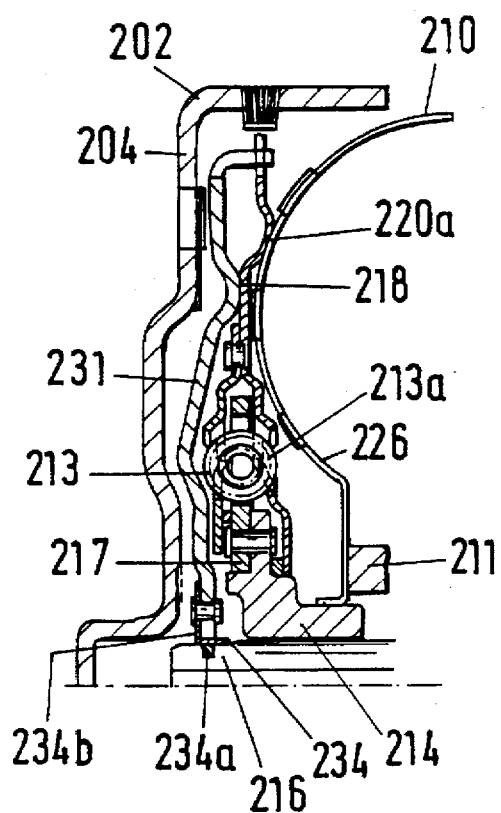
FIG. 4 is a fragmentary axial sectional view of a third torque transmitting apparatus.

FIG. 4 illustrates a portion of a torque transmitting apparatus wherein the piston 231 of the lockup clutch is centered by and is movable axially of an input element 216, e.g., the input shaft of a variable-speed transmission in the power train between the torque transmitting apparatus and one or more wheels of a motor vehicle. An annular sealing element 234a (e.g., an O-ring) is interposed between the radially inner portion 234 of the piston 231 and the input element 216; this sealing element prevents the flow of hydraulic fluid between the two compartments of the chamber in the housing 202 of the torque converter forming part of the torque transmitting apparatus which includes the structure of FIG. 4. The sealing element 234a ensures that the output element 214 of the torque converter is not subjected to any (or any appreciable) stresses acting in the direction of the common axis of the housing 202, turbine 210 and output element 214. Thus, the pressure of fluid or the distribution of fluid pressures at both axial ends of the output element 214 is the same or nearly the same. The reason is that the overall area of that portion of the surface of the output element 214 which is acted upon by fluid in the compartment located to the left of the element 214 (as viewed in FIG. 4) matches or at least approximates the overall area of that portion of the surface of the output element 214 which is located to the right of such element.

Figure 5:
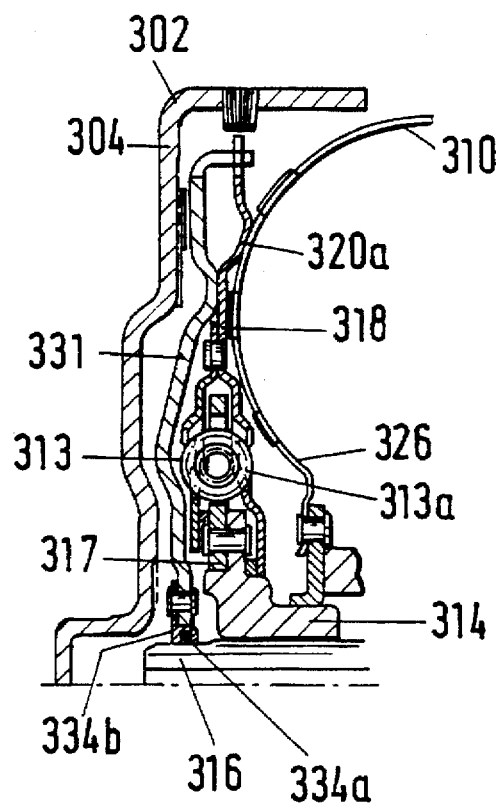
FIG. 5 is a similar fragmentary axial sectional view of an apparatus constituting a first modification of the apparatus shown in FIG. 4.

The situation is analogous in the torque transmitting apparatus of FIG. 5 which also includes a sealing element 334a installed in a separately produced radially inner portion 334b of a piston 331 forming part of the lockup clutch and being centered by and movable axially of the input element 316. The torque converter shown in FIG. 5 includes a turbine 310 having a shell 326, and a housing 302 including a section 304 connectable to the output component (such as the component A in FIG. 3) of a prime mover.

Figure 6:
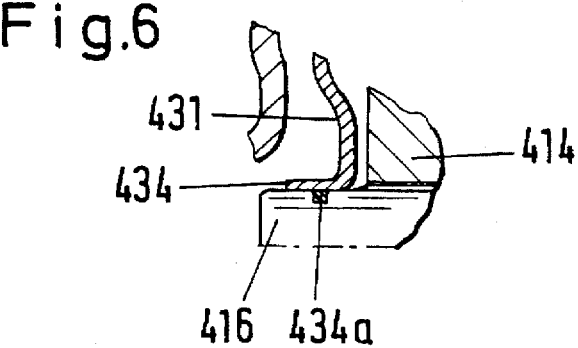
FIG. 6 is a similar fragmentary axial sectional view of an apparatus constituting a second modification of the apparatus shown in FIG. 4.

FIG. 6 shows a portion of a modified torque transmitting apparatus wherein the radially inner portion 434 of the piston 431 forming part of the lockup clutch engages an annular sealing element 434a (e.g., an O-ring) which is recessed into the peripheral surface of the input element 416 of a driven unit. The input element 416 can receive torque from an output element 414 forming part of a torque converter in the apparatus which includes the structure of FIG. 6. The output element 414 (as well as the output element 314 shown in FIG. 5) is configurated in the same way as described above in connection with the output element 214, i.e., the element 414 and/or 314 cannot change its axial position in response to the action of bodies of fluid in the two compartments of the housing forming part of the torque converter including the structure of FIG. 5 and/or FIG. 6.

The difference between the pistons 231 and 431 is that the former includes a separately produced radially inner portion 234 which surrounds the sealing element 234a whereas the radially inner portion 434 is of one piece with the major portion of the piston 431 and surrounds the sealing element 434a. The separately produced radially inner portion 234a has a substantially L-shaped cross-sectional outline and its radially outwardly extending leg 234b is riveted to the major portion of the piston 231.

The sealing element 334a of FIG. 5 is installed in a circumferentially complete groove in the internal surface of a separately produced radially inner portion 334b which is riveted to the major portion of the piston 331. The input element 316 is surrounded by and centers the radially inner portion 334b of the piston 331 and the latter has limited freedom of movement in the axial direction of the input element 316.

The turbine 210 indirectly abuts the piston 231 by way of the input member 218 of the damper 213, and the piston 231 bears against the radially extending wall of the housing section 204 when the lockup clutch is engaged to operate with or without slip. The input member 218 is welded to the shell 226 of the turbine 210 at 220a, and the damper 213 further includes an output member 217 and energy storing means 213a opposing angular movements of the input and output members 218, 217 relative to each other. The connection(s) 220a between the input member 218 of the damper 213 and the shell 226 of the turbine 210 can be established by laser welding.

The shell 326 of the turbine 310 which is shown in FIG. 5 is also welded (at 320a) to the input member 318 of the damper 313 and the latter further comprises an output member 317 as well as energy storing means 313a serving to oppose angular movements of the input and output members 318, 317 relative to each other. When the lockup clutch including the piston 331 is engaged (with or without slip), the friction lining at the radially outer portion of the piston 331 is caused to contact the adjacent friction face at the inner side of the radially extending wall forming part of the housing section 304. The housing 302 is connectable with an output component (such as the component A shown in FIG. 3) of a prime mover, e.g., a combustion engine in a motor vehicle. The connection(s) 320a can be formed by laser welding.

In the apparatus including the structure of FIG. 4, the turbine 210 can turn relative to the output element 214 until arrested by the energy storing means 213a of the damper 213. If the energy storing means 213a includes a set of arcuate coil springs, relative angular movements of the turbine 210 and the output element 214 are no longer possible when the coil springs of the energy storing means 213a have undergone a maximum amount of compression, i.e., when the neighboring convolutions of each such coil spring abut each other. The situation is the same in the apparatus embodying the structure of FIG. 5, i.e., the angular movements of the turbine 310 and the output element 314 relative to each other are brought to a halt when the coil springs of the energy storing means 313a have undergone a maximum amount of compression. Alternatively, the apparatus of FIGS. 4 and 5 can be provided with suitable abutments or stops which limit the extent of angular movability of the input and output members 218, 217 and 318, 317 (i.e., the angular movability of the turbine 210 and output element 214 or the turbine 310 and output element 314) relative to each other.

FIG. 4 shows that the shell 226 of the turbine 210 can come into abutment with the stator 211; this brings about the advantages which were pointed out in connection with the torque transmitting apparatus 101 of FIG. 3.

The apparatus which embody the structures shown in FIGS. 4, 5 and 6 can employ very simple, compact and inexpensive output elements 214, 314 and 414. Such output elements can be configured and mounted not unlike the hub of a clutch disc or clutch plate in the friction clutch of a motor vehicle. Reference may be had, for example, to FIG. 1 of the aforementioned commonly owned U.S. Pat. No. 5,180,335 to Maucher et al. Thus, all that is necessary is to provide the input element 214, 314 or 414 with internal splines which can transmit torque to the input element of a driven unit, such as a variable-speed transmission.

Figure 7:
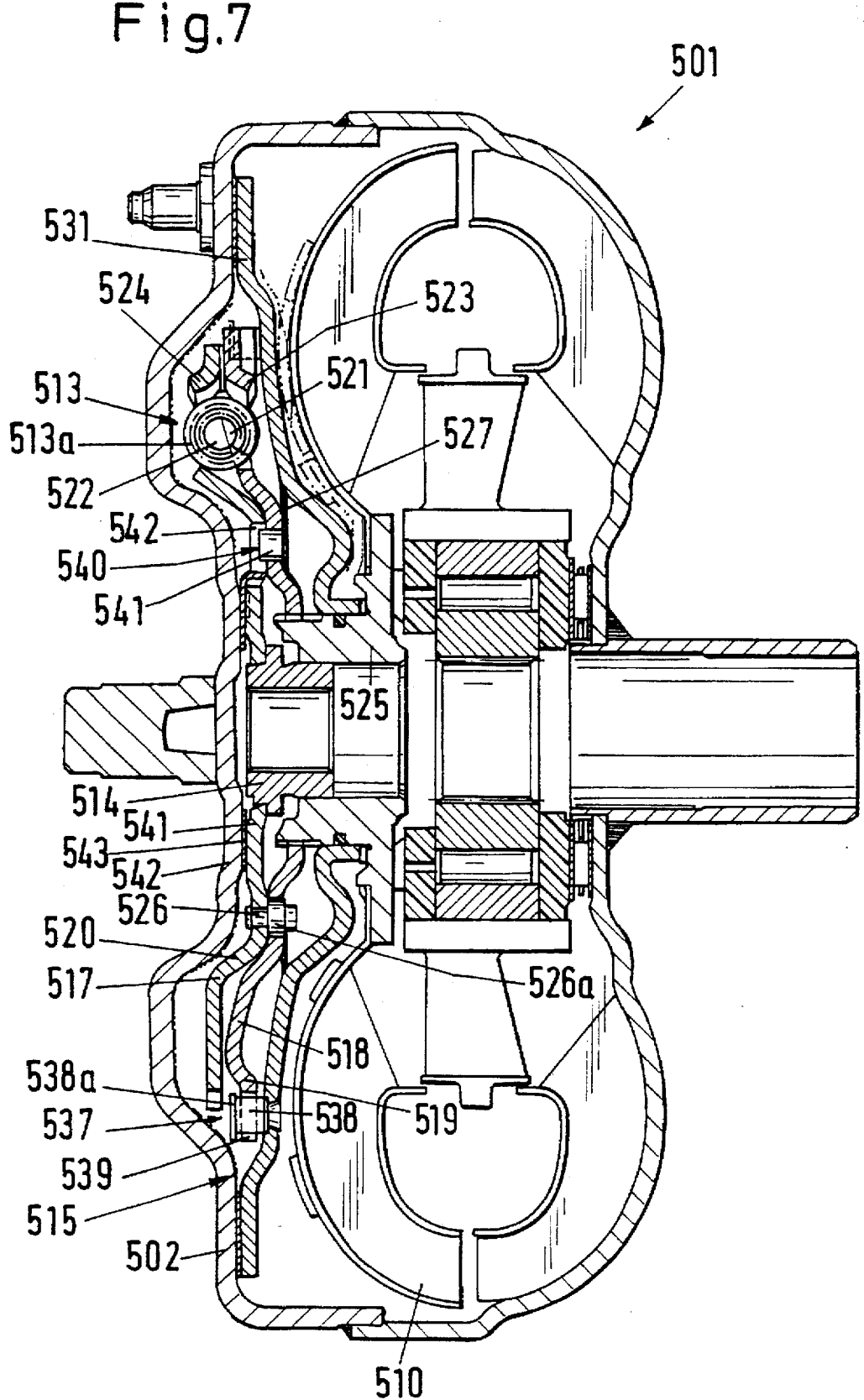
FIG. 7 is an axial sectional view of still another torque transmitting apparatus.

FIG. 7 illustrates a torque transmitting apparatus 501 which, in many respects, is similar to the apparatus 1 of FIG. 1. The main difference between the two apparatus is that the apparatus 501 utilizes a modified damper 513 and a modified lockup clutch or bypass clutch 515.

The turbine 510 of the fluid-operated clutch forming part of the torque transmitting apparatus 501 comprises a radially inner portion 525 which includes or constitutes a hub and is turnable, within limits, relative to the output element 514 of the fluid-operated clutch. The means for limiting the extent of angular movability of the hub 525 and output element 514 relative to each other can include a form-locking connection corresponding, for example, to the connection 27 of the type shown in FIGS. 1 and 2. However, it is equally possible to utilize any other suitable connection which determines the extent of angular movability of the hub 525 and output element 514 (i.e., of the input member 518 and the output member 517 of the damper 513) relative to each other.

The damper 513 in the apparatus 501 of FIG. 7 is even simpler than the aforedescribed dampers because the coil springs of its energy storing means 513a are confined and guided by only two parts, namely a first flange-like or washer-like portion 519 which constitutes the input member 518 and a second flange-like or washer-like portion 520 which constitutes the input member 517. The portions 519, 520 are respectively provided with windows or analogous openings 521, 522 for portions of the coil springs forming part of the energy storing means 513a, and the portions 519, 520 further include substantially wing-shaped guide portions 523, 524 which are adjacent the radially outer portions of the respective windows and extend in the circumferential direction of the portions 519, 520 to provide abutments for the radially outer portions of convolutions forming part of the adjacent coil springs. The input and output members 518, 517 of the damper 513 are adjacent each other as seen in the direction of the common axis of the turbine 510, housing 502 of the fluid-operated clutch and the output element 514. The means for coupling the input and output members 518, 517 to each other with limited freedom of angular movement includes rivets 526 which are anchored in the output member 517 and have shanks 526a extending into arcuate slots provided therefor in the output member 517. The length of the arcuate slots (as measured in the circumferential direction of the input member 518) determines the extent of angular movability of the members 517, 518 relative to each other in a first direction when the vehicle embodying the torque transmitting apparatus 501 pulls a load and in the opposite direction when the vehicle is coasting.

Those heads of the rivets 526 which are located at the right-hand side of the input member 518 (i.e., at the side facing away from the output member 517) support resilient means in the form of a membrane 527 which biases the input member 518 and the axially movable piston 531 of the lockup clutch 515 axially and away from each other. The membrane 527 can be said to constitute an annular spring which urges the input member 518 toward and against the output member 517 and which biases the piston 531 and the input member 518 (i.e., the damper 513) axially and away from each other. The function of the membrane 527 is analogous to that of the resilient means 40 in the torque transmitting apparatus 1 of FIG. 1.

A washer-like friction bearing 543 is installed between the radially inner portion 541 of the output member 517 and the radially inner portion 542 of the radially extending wall forming part of the left-hand section of the housing 502.

The piston 531 of the lockup clutch 515 is non-rotatably connected to the input member 518 of the damper 513 but has limited freedom of axial movement relative thereto. This is achieved by the provision of an axially parallel plug-in connection 537 which operates between the piston 531 and the input member 518. The illustrated connection 537 comprises projections or plugs 538 affixed to the piston 531 and extending, practically without play, into complementary holes or sockets 539 in the radially outer portion of the input member 518. The heads 538a of the plugs 538 are adjacent the left-hand side of the input member 518 and their distance from the other heads (anchored in the piston 531) determines the extent of axial movability of the piston 531 and input member 518 relative to each other.

The damper 513 and the piston 531 of the lockup clutch 515 can be assembled into a module at the manufacturing plant for convenient storage, transport to the locus of use, and installation into the torque transmitting apparatus 501, e.g., in an automobile assembly plant.

The apparatus 501 of FIG. 7 further comprises means 540 for limiting the extent of angular movability of the portions 519, 520 of the input and output members 518, 517 of the damper 513 relative to each other. Such limiting means comprises at least one abutment or stop 541 which is anchored in the portion 519 radially inwardly of the energy storing means 513a and extends, with requisite clearance, into a slot 542 or another suitable hole or socket in the portion 520. It is clear that the stop or stops 541 can be provided on the portion 520 and then extend into sockets in the portion 519. Still further, it is possible to provide one or more stops 541 on, and one or more sockets 542 in, each of the portions 519, 520.

If the illustrated relatively simple limiting means 540 is replaced with a limiting means including two sets of stops 541, one on the portion 519 and the other on the portion 520 (and hence also with two sets of sockets 542, one in the portion 520 and the other in the portion 519), one set of stops can be designed to limit the extent of angular movability of the portions 519, 520 relative to each other in one direction, and the other set of stops then serves to limit the extent of angular movability of the portions 519, 520 relative to each other in the opposite direction.

The stop 541 which is shown in FIG. 7 is a separately produced part which is anchored in the portion 519 of the input member 518. However, it is equally possible to provide the portion 519 and/or the portion 520 with one or more stops which constitute axially shifted parts of the material of the respective portion or which constitute tongues or lugs bent out of the general plane of the respective portion.

The limiting means 540 or its equivalent can be utilized in addition to or in lieu of a form-locking connection between the hub 525 of the turbine 510 and the output element 514. If the limiting means 540 is omitted, the form-locking connection (such as the connection 27 shown in FIGS. 1 and 2) alone ensures that the input and output members 518,517 of the damper 513 are not subjected to pronounced stresses because the damper 513 ceases to transmit torque as soon as the form-locking connection prevents further angular displacements of the turbine 510 and the output element 514 relative to each other. Therefore, the damper 513 can employ relatively simple, lightweight and inexpensive input and output members 518, 519 which occupy a minimal amount of space in the radial and axial directions of the torque transmitting apparatus 501. The form-locking connection establishes for the power flow a path which is parallel to the path for the flow of power by way of the damper 513.

In each of the illustrated embodiments of the improved torque transmitting apparatus, the lockup clutch (such as 515) operates in series with and is located upstream or ahead of the damper (such as the damper 513) as seen in the direction of power flow from the housing (such as the left-hand section of the housing 502 shown in FIG. 7) to the output element 514. Thus, when the lockup clutch 515 is engaged, the housing 502 transmits torque to the piston 531 which transmits (at 538) torque to the input member 518 and the latter, in turn, transmits torque to the output member 517. The output member 517 transmits torque to the output element 514 of the fluid-operated clutch including the turbine 510 and the housing 502. When the lockup clutch 515 is disengaged, the input member 518 of the damper 513 receives torque from the hub 525 of the turbine 510 and the latter receives torque from the pump of the fluid-operated clutch including the turbine 510 and the housing 502.

The output member (such as 517) of the damper is non-rotatably connected with the output element (such as 514) of the fluid-operated clutch. In addition, the output member can be secured to the output element against angular and/or axial movement relative thereto. In fact, it is possible to make the output member of the damper of one piece with the output element of the fluid-operated clutch. Such design entails a pronounced simplification of the torque transmitting apparatus including a reduction of the overall number of parts, savings in space, simplicity of assembly of the damper with the fluid-operated clutch and simplicity of installation of the respective torque transmitting apparatus, e.g., in the power train between the prime mover and one or more driven units of a motor vehicle.

A comparison of the apparatus 1 of FIG. 1 with the apparatus 501 of FIG. 7 indicates that the damper can include a one-piece input member (such as 518) or a composite input member (such as 18 which includes the annular portions 19 and 20). The utilization of a one-piece input member contributes to simplicity of the damper whereas the utilization of a composite input member contributes to more reliable and more predictable confinement and guidance of the springs forming part of the energy storing means of the respective damper.

The annular bearing 543 between the adjacent radially inner portion 541 of the output member 517 of the damper 513 of FIG. 7 and the radially inner portion 542 of the radially extending wall forming part of the housing 502 constitutes a desirable but optional feature of the torque transmitting apparatus. If the bearing 543 is omitted, the radially inner portions 541 and 542 are in direct metal-to-metal contact with each other (for example, the housing 502 and the output member 517 can be made of steel). The resilient membrane 527 ensures that the radially inner portions 541, 542 are in frictional engagement with the bearing 543 or directly with each other. It is further clear that the simple friction bearing 543 can be replaced with an ever simpler or with a more sophisticated thrust bearing, e.g., a bearing corresponding to the bearing 47 in the apparatus 1 of FIG. 1.

The rivet or rivets 526 permit the adjacent portions of the input and output members 518, 517 of the damper 513 of FIG. 7 to bear directly against each other under the bias of the resilient membrane 527. Thus, the members 517, 518 are maintained in frictional metal-to-metal contact with each other. Each of these members can be made of steel or another suitable metallic (or other) material. It is equally within the purview of the invention to install a friction bearing or an antifriction bearing between the neighboring portions of the input and output members 518, 517. This also holds true for the input and output members of the dampers in one or more torque transmitting apparatus which are shown in FIGS. 1-2, 3, 4, 5 and 6.

The turbine 510 of FIG. 7 can but need not be in direct contact with or affixed to the piston 531 of the lockup clutch 515. The provision of an area of direct contact (such as shown at 46 in the apparatus 1 of FIG. 1) exhibits the advantage that it is no longer necessary to provide a firm abutment between the radially inner portion (such as the hub 25) of the turbine and the adjacent parts of the respective torque transmitting apparatus.

The improved torque transmitting apparatus is susceptible of numerous additional modifications without departing from the spirit of the invention. Thus, it is possible to combine certain features of the apparatus 1 of FIGS. 1-2 with the features of the appparatus shown in FIG. 3, 4, 5, 6 and/or 7. For example, the feature (shown in FIGS. 4 and 5) that the shell of the turbine can be moved into direct abutment with the stator of the fluid-operated clutch can be resorted to with equal advantage in one or more other embodiments of the improved torque transmitting apparatus. As can be seen in FIG. 4, the turbine 210 need not be provided with a radially inner portion corresponding to the hub 25 of the turbine 10 shown in FIG. 1. Moreover, the radially inner portion of the shell 226 of the turbine 210 is centered directly on the output element 214 which also contributes to compactness, simplicity and lower cost of the improved apparatus. Angular movements of the turbine 210 relative to the output element 214 are opposed by the damper 213. As already explained with reference to FIGS. 4 and 5, the shell (226, 326) of the turbine (210, 310) can be welded (at 220a, 320a) or otherwise fixedly secured to the input member (218, 318) of the damper (213, 313). Such welded or analogous fixed connections can be replaced with connections which merely compel the turbine and the input element of the damper to share all of their angular movements.

At least certain constituents or certain combinations of two or more constituents of the improved apparatus are believed to constitute features which are novel and patentable per se. For example, the feature that the piston of the lockup clutch can be centered directly by and can sealingly engage the input element of a driven unit (as shown in FIGS. 4, 5 and 6) is believed to constitute a novel feature which can be utilized with advantage in the improved torque transmitting apparatus as well as in numerous heretofore known apparatus employing hydrokinetic torque converters in combination with lockup clutches. The same is believed to hold true for the feature that the turbine of the torque converter can directly abut the piston of the lockup clutch (as at 46 in FIG. 1) and/or that the piston of the lockup clutch is propped close to its friction lining (to thus reduce the likelihood of axial deformation or excessive axial deformation of the piston). This feature, too, can be embodied in certain conventional apparatus employing a hydrokinetic torque converter and a lockup clutch.

The placing of the sealing elements 134a and 150 (FIG. 3) at or close to the same radial distance from the axis of the turbine is also believed to constitute a novel feature which is patentable per se because such positioning of the sealing elements brings about a number of important advantages which are fully described in the preceding passages of this specification.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. Apparatus for transmitting torque comprising a fluid-operated clutch, such as a hydrokinetic torque converter, including a housing connectable with a rotary output component of a prime mover, at least one pump receiving torque from said housing, a rotary output element connectable with a rotary input element of a driven unit, such as a variable-speed transmission, and a turbine interposed between said at least one pump and said output element; at least one torsional vibrations absorbing torque transmitting damper disposed in a power flow between said turbine and said output element and including an input member rotatable with said turbine, an output member connected with said output element and rotatable relative to said input member, and energy storing means arranged to oppose rotation of said members relative to each other; and a form-locking connection provided between and permitting at least limited angular movements of said turbine and said output element relative to each other.

2. The apparatus of claim 1, wherein said fluid-operated clutch further comprises at least one stator disposed in said housing between said at least one pump and said turbine.

3. The apparatus of claim 1, wherein said form-locking connection includes means for limiting the magnitude of torque which can be transmitted by said at least one damper.

4. The apparatus of claim 1, wherein said form-locking connection includes means for transmitting torque between said turbine and said output element in parallel with the transmission of torque between said turbine and said output element by said at least one damper.

5. The apparatus of claim 1, further comprising a lockup clutch connected in series with said at least one damper.

6. The apparatus of claim 5, wherein said lockup clutch is installed in said housing upstream of said at least one damper as seen in the direction of transmission of torque from said housing to said output element.

7. The apparatus of claim 1, wherein said turbine includes a radially inner portion and said form-locking connection is provided between said radially inner portion of said turbine and said output element.

8. The apparatus of claim 7, wherein said radially inner portion of said turbine includes a hub.

9. The apparatus of claim 1, wherein said form-locking connection comprises external teeth provided on one of said turbine and said output element and internal teeth mating with said external teeth and provided on the other of said turbine and said output element.

10. The apparatus of claim 9, wherein said turbine comprises a radially inner portion including a hub surrounding a central passage, said internal teeth being provided on said hub and extending into said passage.

11. The apparatus of claim 10, wherein said passage has a first axial length and said internal teeth have a second axial length at most matching said first length.

12. The apparatus of claim 9, wherein said external teeth are provided on said output element and engage said internal teeth with a predetermined play in a circumferential direction of said turbine.

13. The apparatus of claim 1, wherein said input element comprises a rotary shaft and said output element includes a hub surrounding said shaft.

14. The apparatus of claim 1, further comprising a hollow shaft surrounding said input element, said turbine including a radially inner portion comprising a hub surrounding and being centered by said hollow shaft.

15. The apparatus of claim 1, wherein said output member is carried by said output element.

16. The apparatus of claim 15, wherein said output member includes a flange-like part which is rigid with said output element.

17. The apparatus of claim 1, wherein said turbine includes a radially inner portion comprising a hub and said input member includes a substantially disc-shaped portion connected to said hub so that one of said hub and said disc-shaped portion can transmit torque to the other of said hub and said disc-shaped portion.

18. The apparatus of claim 17, wherein said substantially disc-shaped portion comprises an internal gear mating with an external gear of said hub.

19. The apparatus of claim 17, wherein said input member further includes an annular portion rotatable with said substantially disc-shaped portion about a common axis and spaced apart from said disc-shaped portion in the direction of said axis, said output member including a substantially flange-like portion disposed at least in part between said portions of said input member as seen in the direction of said axis.

20. The apparatus of claim 1, wherein said input member comprises a first annular portion and a second annular portion rotatable with said first annular portion about a common axis and spaced apart from said first annular portion in the direction of said axis, said output member including a substantially flange-like portion disposed between said annular portions and said annular portions being connected to each other radially outwardly of said substantially flange-like portion against relative movement in the direction of said axis.

21. The apparatus of claim 1, wherein said input and output members include means for receiving portions of said energy storing means.

22. The apparatus of claim 1, wherein said housing, said turbine and said at least one pump are rotatable about a common axis, said input member being disposed at a first radial distance and said form-locking connection being disposed at a lesser second radial distance from said axis.

23. The apparatus of claim 1, further comprising a lockup clutch connected in series with said at least one damper and including a piston movable in the direction of a common axis of said housing and said turbine.

24. The apparatus of claim 23, wherein said turbine includes a hub, said piston being centered by and being movable relative to said hub in the direction of said axis.

25. The apparatus of claim 23, wherein said piston is non-rotatably connected with said turbine.

26. The apparatus of claim 23, further comprising means for non-rotatably connecting said piston with said input member, one of said piston and said input member being movable in the direction of said axis relative to the other of said piston and said input member.

27. The apparatus of claim 26, wherein said connecting means is disposed at a first radial distance and said energy storing means is disposed at a lesser second radial distance from said axis.

28. The apparatus of claim 26, wherein said connecting means includes at least one plug provided on one of said piston and said input member and at least one socket for said at least one plug provided on the other of said piston and said input member, said at least one plug extending at least substantially in parallelism with said axis.

29. The apparatus of claim 1, wherein said turbine includes a hub and said form-locking connection is provided between said hub and said output element.

30. The apparatus of claim 29, wherein said turbine and said housing are rotatable about a common axis and said form-locking connection comprises at least one plug provided on one of said hub and said output element and extending at least substantially in the direction of said axis into a socket provided therefor in the other of said hub and said output element.

31. The apparatus of claim 1, further comprising a lockup clutch in series with said at least one damper, said lockup clutch including a piston movable in the direction of a common axis of said turbine and said housing and said housing including a wall extending substantially radially of said axis adjacent said piston, said at least one damper being disposed between said wall and said piston as seen in the direction of said axis.

32. The apparatus of claim 1, further comprising a lockup clutch in series with said at least one damper and including a piston movable in said housing in the direction of a common axis of said housing and said turbine, said at least one damper being disposed between said turbine and said piston as seen in the direction of said axis.

33. The apparatus of claim 32, wherein said housing includes a wall extending substantially radially of said axis, said piston being disposed between said wall and said turbine as seen in the direction of said axis.

34. The apparatus of claim 1, wherein said turbine and said housing are rotatable about a common axis and said input member includes a substantially disc-shaped portion, and further comprising an engageable and disengageable lockup clutch in series with said at least one damper and including a piston movable in the direction of said axis, and resilient means reacting against one of said piston and said disc-shaped portion and bearing in the direction of said axis against the other of said piston and said disc-shaped portion.

35. The apparatus of claim 34, wherein said resilient means bears against said piston in a direction to move the piston in the direction of said axis toward a position in which said lockup clutch is disengaged.

36. The apparatus of claim 1, wherein said housing and said turbine are rotatable about a common axis and said output member acts upon said housing in the direction of said axis.

37. The apparatus of claim 36, wherein said output member includes a radially inner portion which is supported by said housing.

38. The apparatus of claim 36, wherein said output member directly engages and is supported by said housing.

39. The apparatus of claim 36, further comprising means for biasing said output member toward said housing in the direction of said axis.

40. The apparatus of claim 39, further comprising a lockup clutch in series with said at least one damper and including a piston in said housing, said biasing means being interposed between said input member and said piston as seen in the direction of said axis.

41. The apparatus of claim 1, wherein said turbine and said housing are rotatable about a common axis and said input member abuts said output member in the direction of said axis.

42. The apparatus of claim 1, further comprising a lockup clutch in series with said at least one damper and including a piston movable between a plurality of positions in the direction of a common axis of said turbine and said housing, said turbine abutting said piston in at least one of said plurality of positions of said piston.

43. The apparatus of claim 1, further comprising an engageable and disengageable lockup clutch provided in said housing in series with said at least one damper and including a piston movable in the direction of a common axis of said turbine and said housing, said housing including a wall extending substantially radially of said axis and defining with said piston a fluid-filled compartment.

44. The apparatus of claim 43, wherein said piston includes a radially outer portion and said housing comprises a friction face which is contacted by said radially outer portion of said piston in the engaged condition of said lockup clutch, said compartment having a radially outer portion which is sealed from a second compartment in said housing when said radially outer portion of said piston contacts said friction face.

45. The apparatus of claim 1, wherein said turbine includes a shell and is rotatable with said housing about a common axis, said shell including radially inner and radially outer portions and said input member being connected to said shell substantially midway between said radially inner and radially outer portions.

46. The apparatus of claim 1, wherein said turbine includes a shell and further comprising means for connecting said shell with said input member.

47. The apparatus of claim 46, wherein said connecting means comprises at least one rivet.

48. The apparatus of claim 1, wherein said turbine and said housing are rotatable about a common axis and further comprising a lockup clutch provided in said housing in series with said at least one damper and including a piston movable in the direction of said axis, said piston including a radially inner portion sealingly and axially movably surrounding said input element.

49. The apparatus of claim 48, wherein said radially inner portion of said piston includes a sleeve surrounding said input element.

50. The apparatus of claim 48, wherein said radially inner portion of said piston has a recess and further comprising a sealing element extending into said recess and engaging said input element.

51. The apparatus of claim 48, further comprising a sealing element provided on said input element and sealingly engaging said radially inner portion of said piston.

52. The apparatus of claim 1, wherein said turbine and said housing are rotatable about a common axis and said fluid-operated clutch further comprises a stator interposed between said at least one pump and said turbine, said turbine including a shell having a radially inner portion abutting said stator in the direction of said axis.

53. The apparatus of claim 1, wherein said turbine and said housing are rotatable about a common axis and said turbine includes a radially inner portion which is centered by and is rotatable relative to said output element.

54. The apparatus of claim 53, wherein said energy storing means of said at least one damper is constructed and installed to oppose rotation of said turbine and said output element relative to each other.

55. The apparatus of claim 1, wherein said turbine is rotatable jointly with said input member.

56. The apparatus of claim 1, wherein said turbine and said housing are rotatable about a common axis and further comprising a lockup clutch provided in said housing in series with said at least one damper and including a piston movable in the direction of said axis and rotatable with said turbine.

57. Apparatus for transmitting torque comprising a fluid-operated clutch, such as a hydrokinetic torque converter, including a housing connectable with a rotary output component of a prime mover, at least one pump receiving torque from said housing, a rotary output element connectable with a rotary input element of a driven unit, such as a variable-speed transmission, and a turbine interposed between said at least one pump and said output element; at least one torsional vibrations absorbing torque transmitting damper disposed in a power flow between said turbine and said output element; and a form-locking connection provided between said turbine and said output element and including means for transmitting torque between said turbine and said output element in parallel with the transmission of torque by said at least one damper.

58. The apparatus of claim 57, wherein said fluid-operated clutch is a hydrokinetic torque converter.

59. Apparatus for transmitting torque comprising a fluid-operated clutch, such as a hydrokinetic torque converter, including a housing connectable with a rotary output component of a prime mover, at least one pump receiving torque from said housing, a rotary output element connectable with a rotary input element of a driven unit, such as a variable-speed transmission, and a turbine disposed between said at least one pump and said output element and being rotatable with said housing about a common axis; at least one torsional vibrations absorbing torque transmitting damper disposed in a power flow between said turbine and said output element and including an input member having a substantially washer-like portion; a lockup clutch provided in said housing in series with said at least one damper and including a piston movable in the direction of said axis; and resilient means reacting against one of said piston and said washer-like portion and bearing in the direction of said axis against the other of said piston and said washer-like portion.

60. The apparatus of claim 59, wherein said resilient means bears against said piston in a direction to move the piston in the direction of said axis toward a position in which said lockup clutch is disengaged.

61. The apparatus of claim 59, wherein said fluid-operated clutch is a hydrokinetic torque converter.

62. The apparatus of claim 1, wherein said fluid-operated clutch is a hydrokinetic torque converter.

63. Apparatus for transmitting torque comprising a fluid-operated clutch, such as a hydrokinetic torque converter, including a housing connectable with a rotary output component of a prime mover, at least one pump receiving torque from said housing, a rotary output element connectable with a rotary input element of a driven unit, such as a variable-speed transmission, and a turbine interposed between said at least one pump and said ouptut element; at least one torsional vibrations absorbing torque transmitting damper disposed in a power flow between said turbine and said output element; and a lockup clutch in series with said at least one damper and including a piston movable between a plurality of positions in the direction of a common axis of said turbine and said housing, said turbine abutting said piston in at least one of said plurality of positions of said piston.

64. The apparatus of claim 63, wherein said fluid-operated clutch is a hydrokinetic torque converter.

* * * * *